Jan. 2, 1968    E. C. YOKEL    3,361,238
ELECTROMAGNETIC FRICTION TYPE POWER TRANSMITTING MECHANISM
Filed Feb. 15, 1966    2 Sheets-Sheet 1

INVENTOR.
E. C. YOKEL
BY
James E. Nilles
ATTORNEY

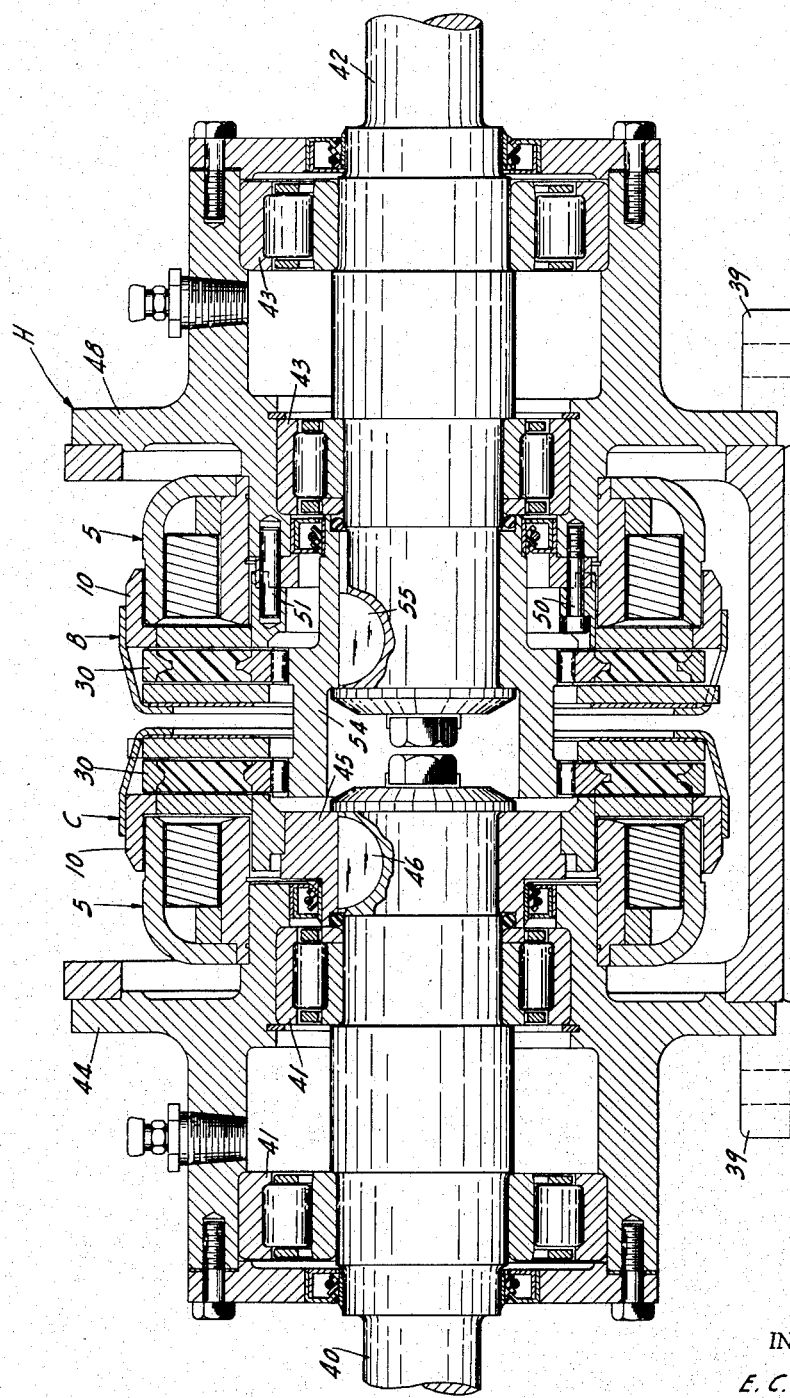

United States Patent Office 3,361,238
Patented Jan. 2, 1968

3,361,238
ELECTROMAGNETIC FRICTION TYPE POWER
TRANSMITTING MECHANISM
Edward C. Yokel, Racine, Wis., assignor to Twin Disc,
Incorporated, a corporation of Wisconsin
Filed Feb. 15, 1966, Ser. No. 527,535
7 Claims. (Cl. 192—84)

ABSTRACT OF THE DISCLOSURE

Electromagnetic friction clutch or the like having an axially slideable armature which is rotationally fixed by peripheral projections engaging a tapered section of the driving ring, and an improved armature construction which is unsupported at its center.

This invention relates to electromagnetic clutches or brakes of the type having disengageable friction surfaces for transmitting power.

Electromagnetic clutches or brakes of this general nature are known and have been used with success, an example of such being the United States Patent No. 2,698,679 issued January 4, 1955.

It will be understood that the invention contemplates either a clutch or a brake although specific reference to each may not always be made in this disclosure.

The present invention provides an electromagnetic friction mechanism which has a plurality of active faces and an armature which is axially slidable but rotationally fixed with respect to the driving portion of the mechanism; the invention also contemplates the use of an improved, composite drive plate which is embraced between a pressure plate and an axially shiftable armature. The result of this arrangement is a particularly compact mechanism which can be easily assembled or disassembled for repair or maintenance, is economical to manufacture, and has exceptionally high capacity for its size.

Another object of the present invention is to provide an improved armature for an electromagnetic mechanism, which armature is capable of more positive and complete engagement with adjacent surfaces and which reduces or eliminates warping of the armature.

Another object of the invention is to provide an improved driving plate for an electromagnetic friction mechanism, which plate enhances the frictional gripping ability of the plate, transmits torque from the outer portion of the plate through a non-magnetic inner portion and then to the internal portion of the plate, which internal portion has gear teeth formed on its periphery for engagement with the member to be driven.

These and other objects of the present invention will appear hereinafter as this disclosure progresses, reference being had to the accompanying drawings, in which:

FIGURE 7 is a longitudinal, cross sectional view through an electromagnetic clutch-brake embodying the present invention.

Figure 1:
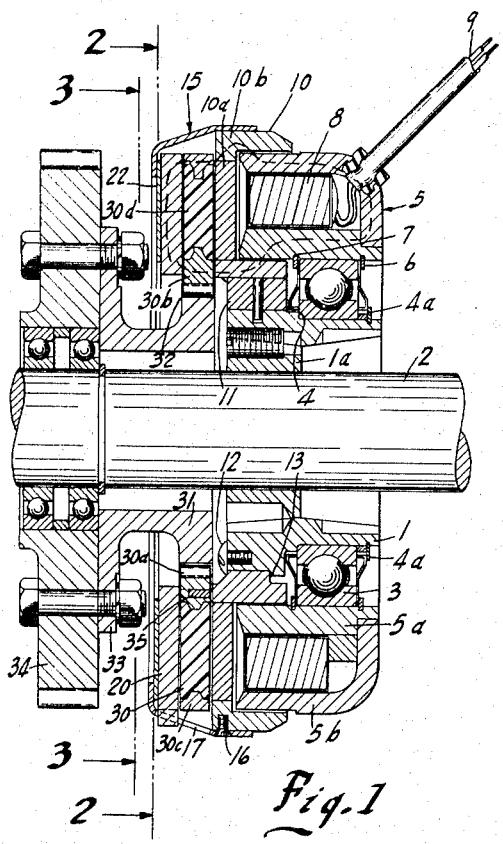
FIGURE 1 is a longitudinal cross sectional view through a mechanism embodying the present invention.
Figure 2:
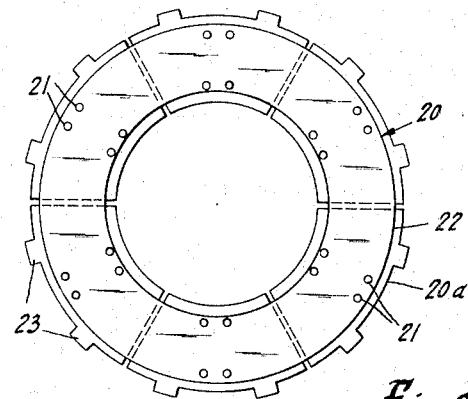
FIGURE 2 is a transverse, elevational view of the armature shown in FIGURE 1, but on a reduced scale.
Figure 3:
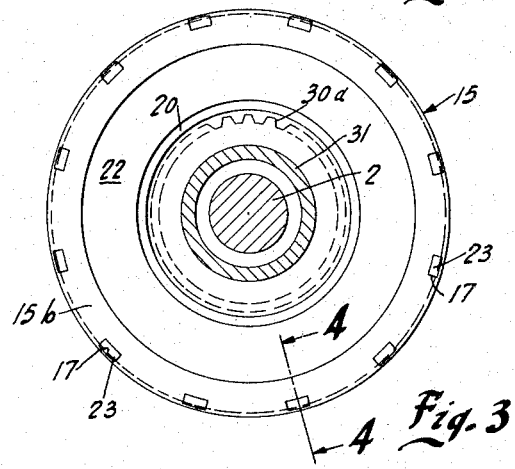
FIGURE 3 is an elevational view of the driving ring shown in and taken along line 3—3 in FIGURE 1, but on a reduced scale.
Figure 6:
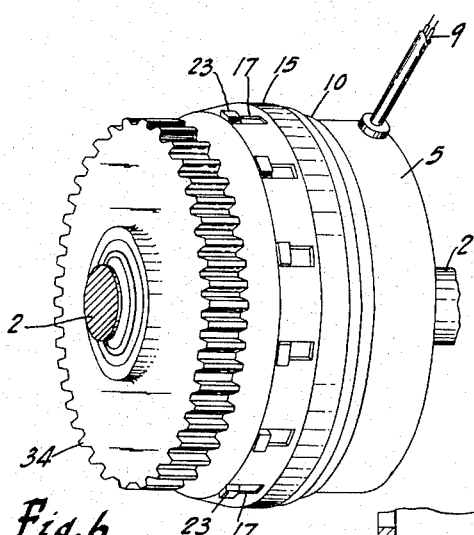
FIGURE 6 is a perspective view of the clutch shown in FIGURE 1, but on a reduced scale.
Figure 4:
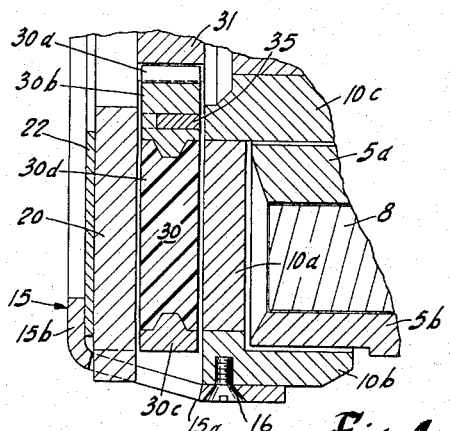
FIGURE 4 is a sectional view taken along line 4—4 in FIGURE 3.

Referring in greater detail to the drawings, a rotatable member in the form of a hub 1 is adapted to be fixed by its tapered bushing 1a to a drive shaft 2. An anti-friction, ball bearing assembly 3 is mounted on the hub between its shoulder 4 and a snap ring 4a. A U-shaped stator 5 is rotatably mounted on the bearing assembly and held thereon by snap rings 6 and 7. An electric coil 8 is located between the radially spaced, annular legs 5a and 5b of the stator 5, and this coil receives energy from a source (not shown) through terminals 9. The stator is stationary and its legs 5a and 5b form stationary poles. The inner leg 5a of the stator may be made of seamless steel tubing while the outer leg is formed from iron hot rolled plate.

A generally U-shaped rotating pole piece or pressure plate 10 is fixed by a key 11 to the hub 1 for rotation therewith as a unit and is concentric with and surrounds the ends of the poles or legs of the stator 5 in nested relationship. This contributes to a compact and efficient clutch. A pair of screws 12 are threadably engaged in the hub and serve to securely hold the pressure plate 10 captive against a shoulder 13 of the hub. The intermediate portion 10a of the plate is formed as a series of spokes which define a series of openings therebetween. These openings are filled with a non-magnetic material which reduces or prevents the passage of the magnetic flux therethrough. Intermediate portion 10a could alternatively be made as a solid disc of non-magnetic material having legs 10b and 10c press fit thereon.

A running clearance is, of course, provided between the legs 10b and 5b and also between legs 10c and 5a. Legs 10b and 10c of the pressure plate are of magnetic material and constitute rotating poles.

An annular, sleeve-like driving ring 15 is deep drawn or stamped of stainless steel and is rigidly secured by screws 16 on the pressure plate 10 and extends outwardly in an axially direction therefrom to form a converging tapered portion 15a and then terminates in a radial flange portion 15b. A series of recesses in the form of twelve rectangular shaped slots 17 extend through and are circumferentially spaced around the tapered portion 15a.

Figure 5:
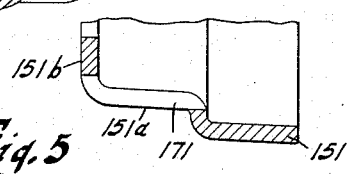
FIGURE 5 is a view similar to FIGURE 4, but showing a modification of the driving ring.

An alternative form of driving ring 151 is shown in FIGURE 5, and also has a radial flange 151b, generally tapered portion 151a and openings 171.

An armature 20 is formed of a number of segments 20a, six for example, which are made from low carbon steel and held together by being spot welded, as at 21, to a flat steel washer 22. These segments each have a pair of driving projections or lugs 23 on their periphery which extend through the slots 17 in the tapered portion 15a of the ring 15. The armature assembly so formed is adapted to abut against and be held captive by the radial flange 15b of the driving ring. Thus the armature can shift axially slightly as will appear, but is rotatably driven by the ring 15.

By making the armature in segments rather than as a conventional solid piece, each segment can move individually to a degree and thus abut more tightly against adjacent surfaces, and furthermore this construction reduces or eliminates the tendency of the armature to warp.

A composite driving plate 30 is located between the pressure plate 10 and armature 20 and has a series of internal teeth 30a which drivingly engage a second rotatable member in the form of an adaptor 31. More specifically, the teeth of the drive plate mesh with teeth 32 of the adapter, and the latter is journalled on shaft 2. In the event the device of the present invention is to be used as a clutch, the flange 33 of the adapter is bolted to a member to be driven, such as a gear 34, and a power through drive provided. If the device is to be used as a brake, then flange 33 could be bolted to a stationary frame (not shown).

To assemble the clutch, the armature assembly is simply axially inserted in position in the driving ring 15, with its lugs 23 extending through their corresponding slots 17, and the driving plate 30 is also set in the ring, before the ring is secured in place by screws 16.

When the electric coil 8 is energized, a path of flux is created, as indicated by the broken lines in FIGURE 1, which causes the driving plate and the armature to be drawn forcibly toward the stator, thus clamping the drive plate 30 between the pressure plate 10 and the armature 20. Both sides of the drive plate are thus frictionally engaged to transmit torque.

The composite drive plate 30 is generally of annular, ring-like shape and is comprised of an outer ring 30c and an inner ring 30b, both of which may be made from mild steel tubing. These concentric rings are rigidly secured together by a friction material 30d, such as asbestos, which is molded therebetween to form rigid drive plate having two good friction engaging surfaces. This nonmagnetic material between the inner and outer rings not only insulates the otuer portion of the plate to prevent flux passing therethrough, but it also functions to "wear balance" the clutch by eliminating some of the metal-to-metal contact.

The torque from the outer ring 30c is transmitted through the intermediate, non-metallic portion 30d to the gear teeth on the inner ring 30b. A series of sulphur-epoxy plugs 35 are packed and cured in circumferentially spaced pockets in both sides of the drive plate. I have found that these sulphur buttons act as a wear controller and the ferrous sulphides which are present act to effectively lubricate, prevent galling and prevent "welding" of the surfaces.

FIGURE 7

The mechanism of the present invention may be utilized in an electromagnetic combination clutch-brake, and reference is made to FIGURE 7 of the drawings wherein one of the mechanisms acts as a clutch while another acts as a brake. Parts used in this arrangement which are similar to those shown in the other figures have been correspondingly numbered in some instances.

More specifically, a housing H is provided having a base mounting portion 39, and in which a shaft 40 is journalled on anti-friction bearings 41. Another shaft 42 is also journalled on suitable anti-friction bearings 43 and extends from the other end of the housing opposite to that of shaft 40.

The clutch C has its stator 5 fixed to an end bell 44 of the housing, while its pressure plate 10 through hub 45 is fixed by a key 46 to shaft 40. The brake B has its stator 5 fixed to another end bell 48 and its pressure plate 10 is fixed by bolts 50 to the end bell 48. Suitable dowels 51 also locate and hold the pressure plate 10 fixed to the end bell.

Suitable seals and gaskets are provided as indicated between the parts.

With this arrangement, the clutch C at the left side of FIGURE 7 has its pressure plate (or pole piece) attached to shaft 40 and its driving plate 30 is in mesh with an adapter 54. This adapter is fixed by key 55 to the shaft 42 and also meshes with the driving plate 30 of the brake B.

In operation the power input can be either into shaft 40 or shaft 42 with the braking action being derived from the brake B which locks the adapter 54 and thus shaft 42 to the end bell 48 of the housing H. The clutch engages or disengages the power train between the shafts.

RÉSUMÉ

The mechanism provided by the present invention is compact, particularly in an axial direction, due to the overhanging construction of the driving ring 15 which surrounds, supports and embraces the armature 20 for axial shifting therein. Two pairs of friction engaging surfaces provide good capacity and holding ability with a minimum requirement of space and the mechanism is easily assembled, disassembled and is economical to manufacture.

Various modes of carrying out the invention are contemplated as being within the scope of the following claims particularly pointing out and distinctly claiming the subject matter which is regarded as the invention.

I claim:

1. An electromagnetic friction mechanism comprising a first rotatable member, a stationary stator mounted on an anti-friction bearing on said first member and having an electric coil, a pressure plate rigidly secured to said rotatable member for rotation therewith and extending radially across said stator and radially outward thereof, a driving ring rigidly secured to said pressure plate and having a tapered portion which converges in an axially direction away from said pressure plate and terminates in a radially inwardly extending flange, said tapered portion having a series of circumferentially spaced apart recesses therein, an annular armature in said driving ring and abutable against said flange and having teeth for driving engagement with said recesses in said driving ring to permit axially shifting of said armature relative to said driving ring, an annular driving plate located between said pressure plate and said armature and frictionally engaged thereby when said coil is energized, and a second rotatable member concentric with and adjacent to said first rotatable member, said driving plate having means for forming a driving connection with said second rotatable member.

2. The mechanism as defined in claim 1 further characterized in that said driving plate comprises, inner and outer rings arranged concentrically in radially spaced relationship and rigidly secured together by friction material molded therebetween, said inner ring having internal gear teeth around its inner diameter and constituting said means for forming a driving connection with said second rotatable member.

3. The mechanism as set forth in claim 1 further characterized in that said driving ring is formed of non-magnetic metal and said recesses comprise openings through said tapered portion.

4. The mechanism described in claim 1 further characterized in that said driving ring is removably secured to the periphery of said pressure plate and convergingly extends axially therefrom.

5. The mechanism as set out in claim 1 further characterized in that said armature comprises a series of separate segments and a plate welded to said segments for holding them in assembled relationship.

6. A flat ring-like armature for an electromagnetic clutch having a driving member, said armature comprising a series of separate segments which together define a flat plate armature, a metal plate welded to said segments for holding them in assembled relationship, said plate being centrally unsupported when assembled in said clutch, each segment having driving projections engageable by said driving member for rotatably driving the armature.

7. A composite driving plate for an electromagnetic clutch comprising an outer ring, an inner ring arranged concentrically with but spaced radially inwardly from said outer ring, a non-magnetic friction material molded between said rings and rigidly securing them together, said inner ring having a series of driving teeth around its internal diameter for engagement with the member to be driven and a plurality of sulphur-epoxy plugs inserted in the sides of said plate and being flush with said sides whereby they function as wear controllers.

(References on following page)

References Cited

UNITED STATES PATENTS

| | | | |
|---|---|---|---|
| 2,279,986 | 4/1942 | Griswold | 192—84 X |
| 2,549,214 | 4/1951 | Lilja | 192—84 |
| 2,698,679 | 1/1955 | Vernhes | 192—84 |
| 3,022,876 | 2/1962 | Frankel | 192—84 |
| 3,190,420 | 6/1965 | Kampf | 192—84 |
| 3,203,279 | 8/1965 | Rahrig et al. | 192—84 X |

DONLEY J. STOCKING, *Primary Examiner.*

ARTHUR T. McKEON, *Examiner.*